United States Patent [19]

Paul et al.

[11] Patent Number: 4,780,885
[45] Date of Patent: Oct. 25, 1988

[54] FREQUENCY MANAGEMENT SYSTEM

[76] Inventors: Haim D. Paul, 37 Ben-Nun Street, Tel-Aviv; Joseph M. Perl, 9 Hashomer Street, Rishon Lezion, both of Israel

[21] Appl. No.: 754,726

[22] Filed: Jul. 15, 1985

Related U.S. Application Data

[63] Continuation-in-part of Ser. No. 514,042, Jul. 15, 1983.

[30] Foreign Application Priority Data

Dec. 1, 1982 [IL] Israel ................................. 67379

[51] Int. Cl.⁴ .................................................. H04B 9/00
[52] U.S. Cl. ........................................ 375/40; 455/62; 455/67
[58] Field of Search ...................... 455/62, 67; 375/40

[56] References Cited

U.S. PATENT DOCUMENTS

| | | | |
|---|---|---|---|
| 3,475,685 | 10/1969 | Covil | 455/62 |
| 3,487,312 | 12/1969 | Egan et al. | 455/62 |
| 3,532,988 | 10/1970 | Magnuski | 455/62 |
| 4,140,973 | 2/1979 | Stevens | 455/62 |

OTHER PUBLICATIONS

"Characterization of Randomly Time–Variant Linear Channels", by P. A. Bello, IEEE Trans Com Systems, CS-11, Dec. 1963.
"Performance Monitor Techniques for Digital Receivers Based on Extrapolation Techniques", by D. J. Gooding, IEEE Trans Com, Com-16, Jun. 1986.

Primary Examiner—Robert L. Griffin
Assistant Examiner—Leslie Von Beek
Attorney, Agent, or Firm—Fleit, Jacobson, Cohn & Price

[57] ABSTRACT

A high frequency (HF) frequency-management system for automatically selecting optimum HF frequency. A frequency management means controls the operation of a regular HF radio communications transmitter and receiver at each station. The frequency-management means transmits sounding signals synchronously and repeatedly over a finite group of HF frequencies, from a first radio communications station to a second radio communications station. Link quality evaluation (LQE) is carried out at the second station. Sounding signals are transmitted synchronously and repeatedly back to the first station. Optimum HF frequencies are selected based on the sounding signals and LQE. An HF communications path is automatically established between stations. The system performs the scanning of the HF frequencies, the detection and measurement of signals, noise and interferences on each frequency and the timing synchronization as required for the frequency management operation.

18 Claims, 4 Drawing Sheets

FREQUENCY MANAGEMENT SYSTEM

The present patent application is a Continuation-in-Part (CIP) application of U.S. patent application Ser. No. 514,042 filed on July 15, 1983.

THE PRIOR ART

Ionospherically propagated radio signals are frequently subjected to severe levels of amplitude and phase distortions from fading, multipath and noise phenomena as well as man-made interference effects.

In attempting to maximize the availability and reliability of communications through the HF medium, it is now well recognized that the following two factors are predominant:

1. The determination of the optimum propagating frequency for any selected path and time, and
2. The validation that this selected channel is also interference free, primarily at the receiver's end.

The most accurate means for specifying propagation conditions over a given HF circuit is attained through real-time oblique path sounding. The incorporation of real-time propagation data with accurate spectrum-interference data at a receiver provides the basis for a practical frequency management system. To be fully effective, however, HF frequency management would also require some means to rapidly disseminate recommended frequencies or spectrum information to multiple HF users. Moreover, this distribution of frequency assignments should be readily available, secure and not subject to the HF outages it is designed to avoid.

The bandwidth that will support skywave communication between any two points is normally much less than the 28 MHz-wide HF spectrum. The available bandwidth changes cyclically on daily, annual, and eleven-year cycles and may be disturbed by unpredictable short-term effects. Frequency assignments are commonly made using forecasts based on the statistical variations of propagation expectancy cycles, the path and the frequencies available to the assigning authority.

Interference may have components due to external causes (galactic, atmospheric or receiver noise) but it is actually man-made noise and particularly the widespread interferences from distant HF stations, that accounts for the main sources of errors in HF data communications. The HF bandwidth is heavily overcrowded especially at night and many observations have revealed that outages due to interferences from other users may exceed those due to propagation by a factor of five. Knowledge of the level of interference present in a communications channel is essential for channel optimization, as communications will take place on a channel showing the greatest value of signal-to-interference ratio.

The most advanced HF frequency management system, typically consists of various combinations of three dedicated equipment items. Two of these items, an oblique sounder transmitter and sounder receiver provide an ionospheric "test set" measuring the propagation of an HF signal vs frequency over the communication path. The third item, a spectrum monitor, provides the extent of interference measured across the entire 2–30 MHz band during the past 5–30 minutes. In a typical chirpsounder system the sounder transmitter sends a linear FM/CW test signal (2 to 30 MHz chirp) and is tracked by a time synchronized chirpsounder receiver at the other end of the communications path.

Spectral analysis of the difference frequency between the sounder receiver local oscillator and the incoming signal yields a time-delay-vs-radio-frequency display.

Specific conclusions with respect to the operational utilization of such a system indicate that:

1. A close operational control and coordination is required between multiple users of the system. Simultaneous soundings requires careful transmitter synchronization.
2. When the pool of assigned frequencies is not very large, the use of this system may prove to be counter-productive or over-specified.
3. In a military environment, sounder transmitters have a very large, identifiable signature and must, therefore, be placed some distance from communication centers to minimize the risk of direction-finding, jamming or physical destruction.
4. The simultaneous radiation of multiple sounding transmitters continuously scanning the entire 2 to 30 MHz band pollutes the HF spectrum, raises the RF noise floor and consequently self-jams friendly HF communication receiving equipment.
5. The HF propagation path is not reciprocal, particularly with respect to the extraordinary modes. Resorting to two-way sounding per link will render the communication network operationally intractable and economically intolerable in view of the magnitude and high cost of such a system.
6. Human judgement and analysis cannot entirely be replaced. Intelligent and experienced assessment of the dynamic ionogram is of paramount importance. This system requires the continuous intervention of a skilled operator.

A radically different concept is therefore needed where a single add-on terminal controls and uses any standard modern HF communications equipment to automatically probe a large number of frequency channels within an assigned HF sub-band. It shall perform sounding, link quality evaluations, select and securely disseminate the best operating frequencies, to achieve rapid and reliable link connectivity.

BRIEF DESCRIPTION OF THE INVENTION

It is the primary object of this invention to provide a new real-time frequency management system which will permit the automatic selection of optimum operational frequencies in HF communication transmitters and receivers. It will establish communication links without the intervention of skilled operators, eliminate the need to resort to propagation predictions, and thus enhance the usefulness and reliability of high frequency communications systems.

In accordance with the foregoing objects the invention herein is directed to frequency programmable HF communication systems which employ transmitters and receivers capable, in response to control signals, of remote tuning and scanning a plurality of channels. A high frequency communication network has one controlling station and a plurality of controlled stations. Means are provided for all stations to continuously monitor a large group of randomly selected frequencies within a given band, measure and analyze their noise and interference characteristics and hard-label each channel as either 'noisy' or 'quiet', based on a set of criteria. The resulting binary word is used by the controlling station, in a preselected format, as the sounding message. Additional means are provided for the controlling station to redundantly broadcast the same sounding message sequentially over each one of the channels. During the sounding and the frequency dissemination cycles, the radio transmitters and receivers are synchronously hopped according to a pseudo-randomly coded sequence.

The controlled station has the means for majority decoding the highly redundant sounding message and further means for measuring the link quality of each channel on which that message was received. The link quality analysis includes means for measuring bit-error-rates (BER), multipath delays, fading rates, interference levels and distributions and signal-to-noise ratios.

The controlled station consequently generates another binary word in which each bit represents a hard-decision, based on a set of transmission quality criteria, as to whether the corresponding, scanned channel is accepted as 'good' or 'bad' for communications. This link quality pattern is now used by the controlled station as its answer-back sounding message.

The controlling station majority decodes the repetitive sounding broadcast made by the controlled station while it synchronously sequences the entire group of frequencies. It performs its own link quality analysis and compares the data processed at both ends of the link. The controlling station now derives the optimal operating frequencies. The selected frequencies are then automatically disseminated usng the same frequency hopping transmission.

Accordingly, the invention relates to a high-frequency (HF) frequency-management system with at least two stations, a controlling station and one or more controlled stations, each including an HF radio transmitter, HF radio receiver, a control unit for controlling the operation of the transmitter and receiver and frequency-management processor means for:

monitoring the interference and occupancy of a finite plurality of HF channels, each channel tuned to a different frequency;

hard-labeling of each one of the said channels as either a binary "1" for a 'quiet' channel or a binary "0" for a 'noisy' channel (or vice versa), based on a predetermind set of criteria;

storing and updating the resulting binary word wherein each bit represents a channel occupancy evaluation of one of the frequencies visited;

using this binary word as a sounding signal and transmitting this signal repeatedly, once over each of the said finite group of frequencies by having the transmitter scan said channels;

synchronizing the remote station receiver so that it is sequenced through same said group of channels at an equal rate, being at each one of the channels at the same period of time as the transmitter, to allow the sounding message to be received;

majority-detecting said redundant sounding message by the remote receiver processor;

performing link quality measurements by the remote receiver processor during the reception of the sounding message on each one of the scanned group of frequencies;

hard-labeling of each one of the said channels as either a binary "1" for a 'good' or 'acceptable', and a binary "0" for a 'bad' or 'not-acceptable' communication quality based on another set of criteria;

storing the resulting binary word at the remote station receiver-processor, to be used by it in forming the answer-back sounding signal;

transmitting the answer-back sounding message repeatedly, once over each of the said group of channels by having the remote station transmitter scan said channels;

majority-detecting said redundant answer-back sounding message by the first, controlling station receiver processor;

performing link quality measurements by the controlling station receiver-processor, on each one of the said scanned group of frequencies during the reception of the back sounding (or reporting) message.

selecting optimal frequencies by the controlling station processor, for reliable communications in both directions, controlling-to-controlled and controlled-to-controlling stations, based on the analysis of the received and derived link quality patterns;

utilizing the synchronous frequency-hopping mode which is maintained between the stations, to disseminate frequency information by transmitting, over the selected optimal frequencies, the selected communication frequencies for the remote station;

automatically tuning the communications transmitters and receivers to the selected preferred frequency or frequencies, to establish a reliable communication path between the stations;

perform the communication by automatically performing the connectivity achieving function between any two net members, as a result of which these two members can communicate with each other on the best momentorily available frequency.

The timing and control means comprise:

means for randomly selecting N channels from within a specified HF sub-band given its limits $f_{low}$ to $f_{high}$;

means for storing said N channels as alternate communication channels with each channel having a predetermined frequency;

receive/transmit means for placing the station in a transmit mode;

means for sequencing and tuning the HF receiver and transmitter through the group of N channels;

means for providing timing for the overall system operation, bit synchronization, frame sync acquisition, sync cycle operation, sounding cycle operation and signal processing algorithms;

means for transmitting the sounding messages using an in-channel diversity of two FSK modulators-demodulators (or a multitone DPSK modulator-demodulator);

means for generating a predetermined sequence based on the input of a key variable and real time of day.

The noise and interference measurement means comprise:

means for measuring the radio receiver AGC level and radio receiver noise output and distribution;

means for measuring in-channel interference characteristics;

means for classifying noise and interference present on the communication channel into a predetermined number of categories, according to a predetermined set of criteria;

means for generating a corresponding number of binary words, each N-bit long, one for each category, wherein each bit represents a hard-decision qualifying each one of the N communication channels monitored.

The link quality analysis means comprise:

means for detecting noise representative of the noise present within the communication channel band as well as within two separate FSK channels;

data detectors for providing a signal representative of the data levels that are present on the communication channel that the receiver is tuned to;

means to measure the signal-to-noise ratio, the rms fading rate, and the rms multipath delay spread;

means to use the demodulated and majority-detected sounding message to arrive at the actual bit-error-rate or predicted voice quality;

means for quantizing the parameters: signal-to-noise-ratio and bit-error-rate, in combination with one or more of the parameters: fading rate, delay spread, channel noise, data levels, measured on the communication channel to define the desired predetermined number of link quality categories according to a predetermined set of criteria;

means for generating a corresponding number of binary words, each N-bit long, one for each category, wherein each bit represents a hard-decision qualifying respectively one of the N communication channels sounded where "good" channels are represented with a "1" and "bad" channels with a "0";

The advantages and further objects of the invention, and the means by which they are achieved may be best appreciated by referring to the detailed description which follows.

BRIEF DESCRIPTION OF THE DRAWINGS

A more complete description of this invention may be had by reference to the accompanying drawings, illustrating a preferred embodiment of the invention to be described in detail, wherein.

DETAILED DESCRIPTION OF THE EMBODIMENT

Figure 1:
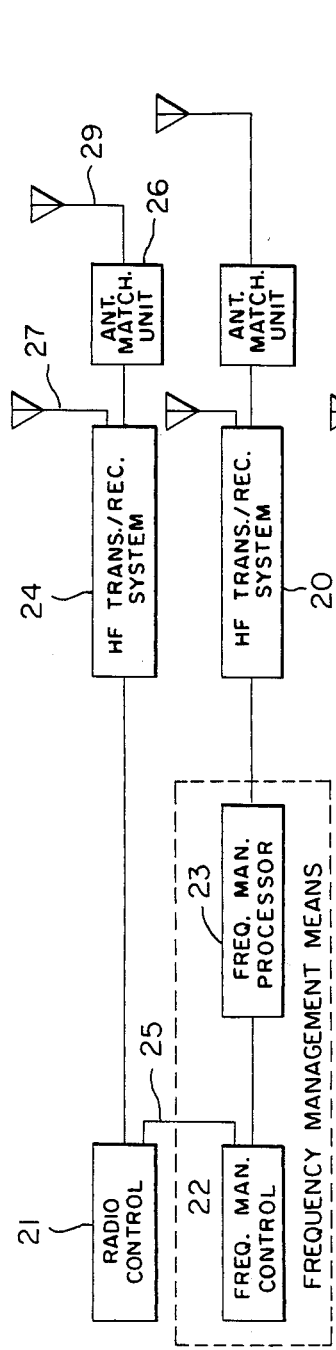
FIG. 1 depicts three block diagrams illustrating three different configurations of HF communications systems in which the frequency management means of the present invention is integrated.
Figure 1:
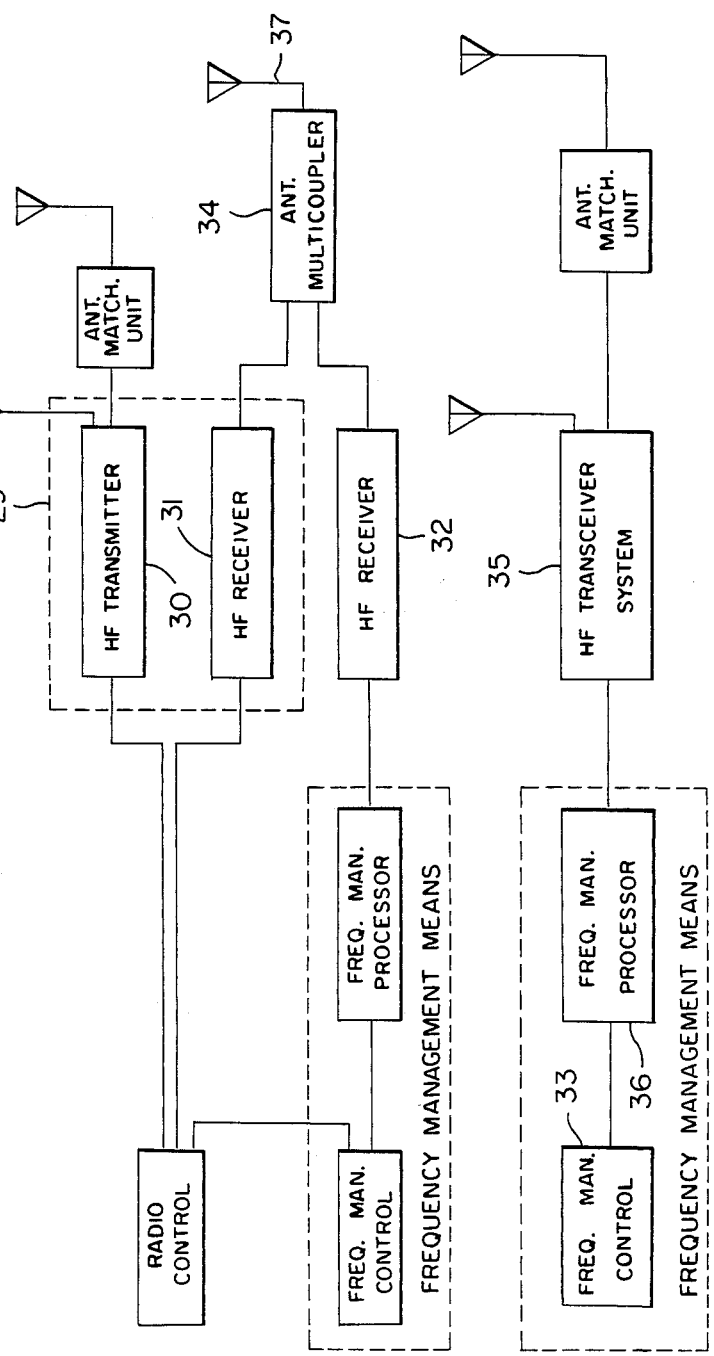

Before going into a detailed description of the figures a brief overview will be given describing the environment and general features of the system.

The operational situation typically assumes a network of HF radio users generally structured using a net controlling station in association with a plurality of widely scattered controlled stations, including relay stations. Each controlled net station is expected to continuously monitor the net traffic and to respond if polled by the controlling net station. Only one station at a time would then be transmitting, with transmit discipline being maintained by the controlling station.

Centralized frequency management and control, with full frequency assignment authority would normally be the responsibility of the controlling station, within the single-net or the multi-net configuration. Operational configurations, however, using one-way transmissions only, utilize the capability of the present invention to assign the selection of optimal HF frequencies to the controlled terminal.

The system according to the invention, can be used for the real-time management of HF communication networks having one controlling station and one or more controlled (or remote) stations. The system is adapted to provide a frequency management capability for any predetermined number of frequencies. Practical considerations show that generally, a number of from about 50 to about 150 frequencies provides a suitable system, depending on the conditions of use and the required speed and reliability. The operating sub-bands are chosen to have an adequate width for accomodating the predetermined number of frequencies, with an adequate spacing between the frequencies used. In the following, the invention is illustrated in an entirely arbitrary manner with reference to a system of 125 channels. It ought to be understood that this is by way of example only, and that any reasonable and practical number of channels can be managed by such systems.

As stated above, the invention is illustrated with reference to the system which provides a total capability of frequency managing a group of 125 frequencies, randomly distributed between any sized sub-band $f_1$ to $f_2$ of the HF spectrum, for any sized time period $t_1$ to $t_2$ of the day and night. The operating sub-band must be at least 500 kHz wide to accommodate 125 channels at 4 kHz spacing. Thus, the system can be programmed to process, excluding used or forbidden frequencies, the entire HF band all of the time or any smaller propagation windows of usable frequencies grossly predicted to be effective at certain corresponding time periods. It is to be clearly understood that this example is illustrative and ought to be construed in a non-limitative manner.

This ensemble of 125 automatically pre-assigned frequencies constitutes the frequency management single, widewband operating channel. Within this channel information is time and frequency multiplexed, redundantly utilizing the 'good' and the 'bad' available frequencies.

The system can be programmed to operate in either one band or two separate bands.

1. One Frequency Band: One pair of frequencies shall define the limits of the expected operational band. Within this band, 125 frequencies will always be available for evaluation, regardless of the size of the band, with 4-kHz minimum spacing.

2. Two Frequency Bands: Four frequencies shall define two separate 'DAY' and 'NIGHT' operational bands, which may have overlapping regions. A single transition hour will be chosen for the transfer from the DAY band to the NIGHT band, or from 125 DAY frequencies to 125 NIGHT frequencies.

A non-repeating, key-controlled permutation of numbers 0 to 125, determines the actual frequency locations and their transmission sequence within the defined operational bands.

With two bands the system is actually processing 250 HF frequencies, during the 24-hour period. Alternatively, the 125 (250) discrete frequencies can be loaded via the front panel or the remote control loader.

These 125 frequencies are continuously monitored by each of the net stations and the channel noise and interference is evaluated. The controlling station initiates the sounding transmission. The sounding signal consists of local noise information analyzed at the controlling station location. During the sounding cycle the controlling station scans through all of the 125 frequencies in a random sequence.

The spacing between frequencies shall be in multiples of 4 kHz. Given a band $F_1$ to $F_2$ then, for any subset of numbers $\overline{N}=\{n_1, \ldots, n_{125}\}$ randomly chosen from the set $\overline{N}=\{1, 2, \ldots N_{max}\}$, where $$N_{max}=(F_2-F_1)/0.004$$

($F_1$ and $F_2$ being in MHz)
The corresponding frequency set is $$\{F_{ni}\} ni\epsilon\overline{N}, F_{ni}=F_1+(ni/250)[MHZ].$$

The receiving net controlled-station steps synchronously with the transmitting controlling-station and performs channel quality evaluations pertaining to each of the 125 channels. The controlled station will sequentially respond by a back sounding cycle, scanning again all 125 frequencies. The sounding signal will now carry local reception quality information back to the controlling-station, again frequency-hopping over all 125 channels, in a random sequence. The controlling-station performs its own link quality analysis and compounds it with the information received and processed through the sounding signal from the controlled station.

A single two-way exchange of real-time sounding transmissions thus enables the controlling station to derive and reliably select optimum operating HF frequencies to each communicating link. Following the selection, an allocation cycle is initiated by means of which the best frequencies are allocated to the net.

It is a central feature of this invention that the frequency management process acts as an automatic HF link control to achieve an adaptive channel and enhance communication reliability.

FIG. 1 illustrates in a block diagram form three of the many other possible configurations of HF radio communications systems, incorporating the preferred embodiment of the present invention. The frequency management means would normally be closely integrated with the radio equipment.

In FIG. 1a a conventional HF radio communications system is shown that includes a radio remote control unit 21, the HF transmitter/receiver 24, and a matching unit 26 to couple a narrowband antenna 29. This matching unit need not be used when a broadband antenna 27 is available. The frequency management means is shown to comprise a remote control unit 22 and a processor 23 which is connected to another conventional but dedicated HF transmitter/receiver 20. The two control units are interconnected by 25 to allow automatic frequency assignment and control. In this configuration the information channel 21,24 is entirely independent from the frequency management system channel 22,23,20. The information channel 21,24 which normally uses one frequency (half-duplex) or two frequencies (duplex) will not be interrupted by the frequency management operation. The frequency management channel, which uses 125 frequencies operates simultaneously and continuously on a non-interference basis.

In FIG. 1b the HF radio system 29 is shown to comprise a separate HF transmitter system 30 and an HF receiver system 31. These may be physically widely separated. The frequency management means, however, uses only a dedicated but conventional HF receiver 32. The two receivers connect to a single receive antenna 37 through an antenna multicoupler 34. In this configuration the system shares the communications transmitter only, which is therefore used both for information transfer as well as frequency management transmissions. The frequency management receiver can thus uninterruptedly monitor the 125 channels.

In FIG. 1c a single remote control unit 33 combines the communication and frequency management operations, audio and control, through the system processor 36 which connects directly to the HF radio transmitter/receiver 35 that serves both. Since this configuration requires the least external equipment, it is the one implemented at present.

As previously stated, each frequency management means in the net shall maintain a continuous evaluation of all 125 channels by examining the prevailing interference in the normal communication 3-kHz bandwidth. This monitoring process shall go on at all available times, by means of the HF system communication receiver. Each frequency management means shall sequentially scan the programmed list of 125 frequencies, continuously compiling and updating channel occupancy statistics.

The number of available operational channels will depend first of all on the likelihood of finding any quiet frequencies (from the pre-assigned group) during all hours of the day and night, while the rate at which the channel must be evaluated will depend on the likely variability of the noise spectrum and propagation conditions with time.

The term 'quiet channel' generally implies a channel whose noise and interference level, inherently a variable quantity, only slightly exceeds some measured noise floor averaged within a limited bandwidth, or a fixed noise level that corresponds to a low-level signal induced into the antenna, or the threshold of atmospheric noise.

However, the characteristics of the interference in the channel, depending on the traffic and mode of operation, will determine whether the channel could be expected to support an acceptable intelligibility of voice or an acceptable bit-error-rate. The power spectral density of interference from other HF users may be significantly non-white within HF voice channels. Low frequency CW, Morse Code or narrowband FSK may characterize an HF channel as 'noisy', while it may still support intelligible voice.

According to the invention, a predetermined number of quantum states is defined, respective to a predetermined number of parameters, the main ones being signal-to-noise ratio and bit-error-rate, the others being channel noise, data levels, fading rate, delay spread. Advantageously, the parameters measured comprise at least the two main ones. These can be measured with one or more of the other parameters. Any combination of one of the main parameters with two or more of the other parameters can also be used.

As stated above, the invention is illustrated with reference to a system of 125 channels, and it is further illustrated with reference to eight quantum states classifying noise and interference present on the communication channel.

Eight quantum states of noise and interference power/frequency distribution are defined. Measurements will continuously indicate which of the eight thresholds has been crossed at each of the 125 3-kHz channels. For each of these eight states a panoramic pattern will rapidly be formed, qualifying as 'quiet' or 'noisy' each one of the 125 channels that the entire net is currently evaluating. These patterns will be continuously updated throughout the monitoring periods. The labeling of a channel as 'quiet' or 'noisy' will represent a hard-decision, producing the best available choice and including always a fixed, a minimum number of the 'quietest' channels in each pattern. With net stations dispersed over a wide geographic expanse, different interference conditions will be experienced at different locations, which will most likely result in a very different Interference Measurement Pattern (IMP).

This IMP will thus constitute a sequence of binary measurements, 125 bits long, where each "1" or "0" corresponds to a hard-decision interference-state measurement. Each one of the monitored channels is labeled Quiet ("1") or Noisy ("0") at the terminal's location, based on the continuous monitoring and updating of channel occupancy statistics, in 5 or 30 minute time-segments. Each bit position will correspond to the exact channel position in an automatically produced coded table of 125 frequencies.

The process of real-time HF channel selection normally involves a single two-way transmission exchange between a controlling frequency-management terminal and a controlled frequency-management terminal. However, reliable channel assessment may also be produced through a one-way transmission process.

The IMP, the continuously compiled and updated interference measurement pattern, is used as the primary sounding signal by the controlling terminal. A sounding transmission will comprise a single cycle of 125 pseudo-randomly selected HF frequency hops, repeating the same message in a burst of audio data, once every hop. During each successive frame period the same frequencies are visited but according to a different, non-repetitive PN-coded permutation, controlled by a non-linear sequence generator (NLSG).

The identical, redundant sounding message will be sent over each one of these HF frequencies by means of noncoherent FSK, using 2-nd order in-band diversity, at a rate of 224 bits per second. The use of dual channel FSK contributes also to an increased correlation between assessed channel quality and voice quality. Alternatively, a multitone DPSK channel performs the same functions.

Figure 2:
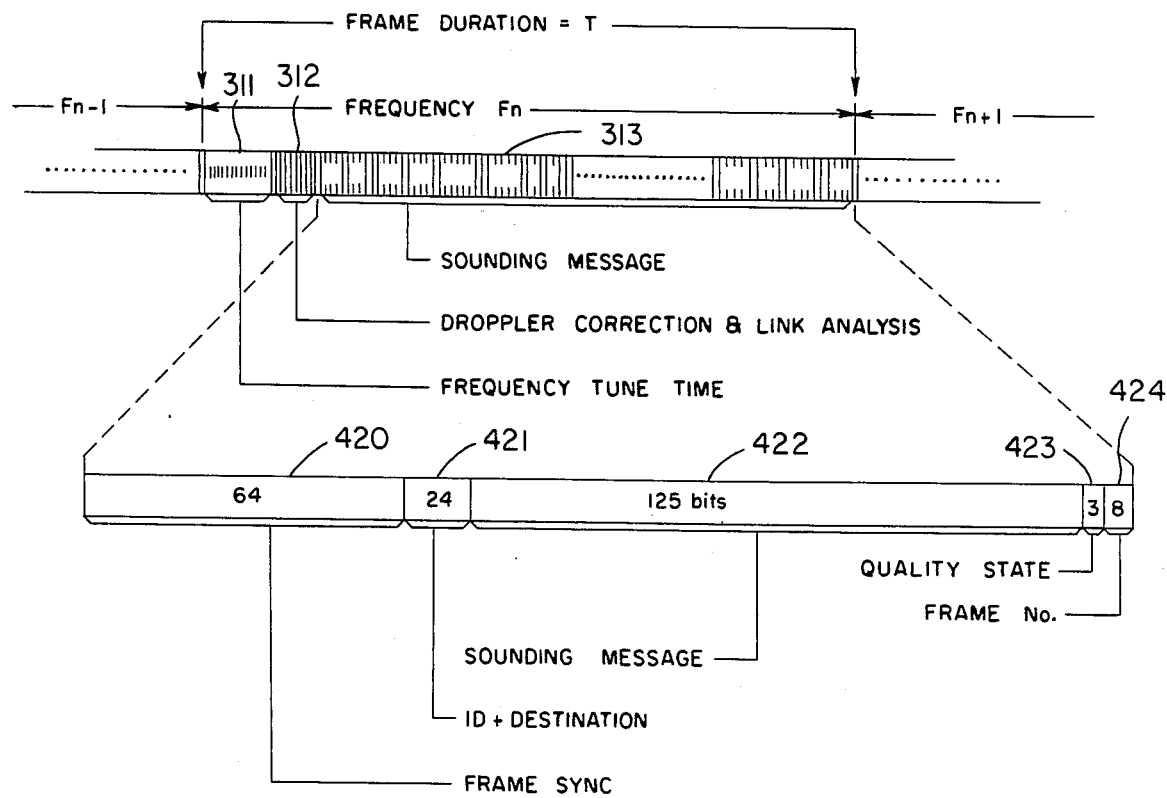
FIG. 2 outlines the format for sounding messages between net stations.

FIG. 2 is a timing diagram of the selected burst format of the sounding frame 311+312+313 which has a hopping rate of 1/T hops per second. Each frame starts with a frequency time guard period 311 which is long enough to allow frequency change time, antenna match time and receiver AGC settling time. During the next time period 312, the receiver doppler correction loop (in the AFC circuit 35 in FIG. 4) utilizes the dual-FSK tones and filters to compensate for frequency drifts. The following time period 313 is devoted to the data block which consists of a total of 210 bits. The first segment 420 of 64 bits each are the synchronization unique words used to provide frame sync. The next segment 421 of 24 bits is used for IDs of sender and destination. The following segment 422 of 125 bits accommodates the sounding message. Segment 423 of 3 bits indicates 1 of 8 quality states to which the current sounding pattern belongs. The last segment 424 of 8 bits is the only one that varies with each frame as it indicates the frame number, from 1 to 125. The sounding message is sent by means of dual-FSK (or by multitone DPSK) transmissions at 224 bps and then 125 times by hopping over each of the 125 channels.

The sounding station (controlling or controlled) transmits its message on each frequency in turn, and all the remote receiving net stations being synchronized to the sounding station, repeatedly receive the identical message at each frequency. A unique majority-logic decoding algorithm (across the sounded frequencies) insures a very high probability of receiving all messages error-free, under extremely varying communications conditions. This capability of secure message transfer by redundant transmissions is a unique characteristic of the frequency management system embodied in the present invention, and its strength is shown by the following analysis.

The same sounding message of N bits (N=125) is being received over N channels, each channel with its own bit-error-rate (BER). One can make a first approximation and classify HF channels as "blocked" when their BER $\geq \frac{1}{2}$, or "open" when their BER=B<$\frac{1}{2}$.

Under these simplifying assumptions if N=2n+1 is the number of tested channels, M of which are blocked, the probability of error in any one bit under an N/2 majority decision rule is:

$$P^M(B) = \left(\frac{1}{2}\right)^M \sum_{l=0}^{M} \binom{M}{M-l} \sum_{k=n+1-M+l}^{N-M} \binom{N-M}{k} B^k (1-B)^{N-M-k}.$$

A further approximation takes into consideration two types of "open" channels: 'Good', when the BER=$B_2$ and 'Bad', when the BER=$10^{-1}=B_1$.

In addition to the M blocked channels, the proportion of the 'Good' and 'Bad' channels is known to vary considerably between day and night. During the day some 20 to 30 percent of the N-M channels may be considered 'Bad' while during the night 40 to 70 percent of them may turn out to be 'Bad', on the average.

Under these assumptions the probability of error in any one bit, after majority decoding is (the number of $B_1$ channels being $I_1$):

$$P^M(B_1, B_2) = 2^{-M} \sum_{j=0}^{N} \binom{M}{j} \sum_{L=0}^{I_1} \binom{I_1}{L} B_1^L (1-B_1)^{I_1-L} \sum_{\substack{k=n+1-j-L \\ k \geq 0}}^{N-M-I_1} \binom{n-M-I_l}{k} B_2^k (1-B_2)^{N-M-I_1}.$$

One can evaluate the average bit error probability over a discrete distribution of channel qualities for the "open" channels. If a typical channel distribution is as follows:

| BER | $\frac{1}{2}$ | $10^{-1}$ | $10^{-2}$ | $10^{-3}$ | $10^{-4}$ | $10^{-5}$ |
|---|---|---|---|---|---|---|
| % of "open" channels | 5 | 10 | 30 | 40 | 10 | 5 |

The average bit error probability after majority decoding for $N=125$ and $M=50$ percent would be: $5\times 10^{-14}$, namely, even under very severe conditions, with enough tested channels the bit error rate of the reference sounding message is remarkably low.

Once the error probability for any one bit in the majority-decoded sounding message has been evaluated, one can evaluate the probability of receiving an errored sounding message, PE, and then the probability of receiving an exact sounding message which is given by $1-PE$. For a total 3n bits of message (2n+1 channels and n−1 control bits), $$PE = 1-(1-P^M)^{3n}$$

Hence, this capability of secure acquisition of the sounding message, through utilizing the highly redundant transmission scheme, is a unique and a central aspect of the present invention.

To maintain system synchronization all terminals must step their non-linear sequence generator (NLSG) clocks with their phases directly related to the transmitting terminal clock which takes the lead. The NLSG has several special features, in addition to the basic functions. It provides synchronizing or resynchronizing capability, the NLSG can be returned to a known starting point and then stepped to a predetermined point in time, in the process of initialization.

The PR bit stream is based on a key-variable contained within the NLSG. The NLSG is programmable with respect to the variable in the sense that the current variable can be replaced with a new one as required, by means of a special external loader. A zeroizing function is also provided, should it become necessary to clear all stored data in the NLSG, under emergency conditions.

The synchronized pseudo-random sequence generators at all frequency management means determine the same new frequency for each successive frame. The frequencies are selected from the string of bits generated by the NLSG each time the frequency is to be changed.

During reception of the repeated sounding message, the system maintains an elaborate Link Quality Analysis, performing simultaneous measurements of all the parameters considered essential to the monitoring of communication traffic. Link quality analysis or in-band channel evaluation is a key process in enhancing HF frequency selection and communication system performance estimation/projection.

The frequency management means incorporates advanced signal processing algorithms that permit measurements of all essential parameters within the time constraints imposed by the time-varying HF channel. A fundamental measure of system channel performance degradation in a digital communication system is the bit-error-rate (BER). In the period of time that the HF channel transfer function may be approximted as quasi-stationary, it is commonly difficult to accumulate sufficient bit errors to characterize near-instantaneous data performance. The invention uses a modified approach of error rate extrapolation based upon pseudo-errors (PBER) to estimate the probability of error in a very short time. Pseudo errors may be generated by modifying the gain or phase threshold criterion in the error decisions process to obtain parameters which indicate apparently greater circuit degradation than really exists. The measurement period is shortened since the pseudo-error is designed to be larger than the corresponding actual error rate. The basic idea is that by narrowing the "good detection region" and widening the "error detection region" one measures a higher BER than the actual BER of the detector. As a result, high accuracy low BER values can be measured from (a) small data samples, and (b) without actually knowing the transmitted data. The PBER and the actual BER are related as follows:

$$\log P_P = K + \log P_E$$

where $P_P$ is the bit pseudo-error probability and $P_E$ is the actual error probability.

If the transmitted data is known, or derived from majority decoding of repetitive soundings, as is done in this invention, one can "scale the channel" by calculating K out of measured $P_P$ and $P_E$.

It should be emphasized that the above was developed mainly for linear, additive noise type fading channels. Since this is not always the case with the HF channel, a certain correction should be made which will account for this discrepancy. The channel BER model can be rewritten as:

$$\log P_P = K + \log P_E + K_1$$

where $K_1$ is a compensating factor whose value is derived from the burst error statistics of the HF channel.

When the sounding cycle has ended, the frequency management means has at its disposal a wide variety of information about each of the N sounded channels. The present invention takes advantage of its unique capability to fully recover the sounding message bit-sequence. This original message is used for error counting, PBER and BER determination.

Measurements are performed also of the rms multipath delay spread, the fading rate, interference levels and distribution, and SNR. This data is processed and updated with every additional sounding transmission. A very reliable characterization of the HF communication channel results. Knowledge of the channel conditions and parameters enables the prediction of channel performance at high data rate transmissions based on low rate data transmissions.

Tested channels are also ranked for various uses: voice, multi-tone DPSK modem, wideband FSK, narrowband FSK, etc. The intended operational use clearly affects the link quality determination since interferences have different effects in different applications.

Based on the link quality analysis and operational mode, hard decisions are made by the receiving terminal, qualifying as "Good" or "Bad" each one of the 125 channels tested. A binary Link Quality Pattern (LQP) of transmission performance measurements is generated, where each one of the tested channels is labeled "1" (Good) or "0" (Bad). "1" to indicate an acceptable channel and "0" to indicate an unacceptable channel. Acceptability is determined based on eight quantum states of performance characterizing eight separate link quality patterns. These LQPs represent the best available choice and include always a fixed, minimum number of the 'best' channels in each pattern. For example, in the limiting case, with all other measured parameters equal, "Good" or "Bad" may indicate, say, $BER < 10^{-3}$ or $BER > 10^{-3}$.

Following the Doppler correction and AGC settling, the receiving frequency management means must perform the following functions:

a. Recover clock timing for bit detection;
b. Recognize the frame-sync unique synchronizing word to establish the basic frame timing reference and identify net number;
c. Identify the ID patterns. These bits enable the receiver to verify the validity and legitimacy of the received burst;
d. Accept the remaining portion of each message. Arrive at the correct IMP or LQP and process the necessary tests, evaluations and decisions;

To illustrate the system's operation, let the controlling frequency management means, C, initiate a sounding broadcast cycle. C uses as a sounding signal its most recent IMP. The controlled frequency management means, c, derives C's IMP error-free, which provides it with the noise and interference levels measured at C's location, in each of the 125 channels monitored. In addition, c carries out 125 LQP tests, during the sounding cycle, to sort out the "Good" channels. The final results can be tabulated as in the following simplified example:

| Channel No. | 24 | 25 | 26 | 27 | 28 | 29 | 30 | 31 |
|---|---|---|---|---|---|---|---|---|
| C's IMP (received) | 0 | 0 | 1 | 0 | 1 | 1 | 0 | 1 |
| c's IMP (measured) | 1 | 0 | 0 | 0 | 1 | 0 | 1 | 1 |
| c's LQP Decisions | G | B | B | G | B | G | B | G |

(G for "Good" and B for "Bad")

From the above data c can immediately deduce that:
a. At the controlling frequency management means C, frequencies 24, 25, 27 and 30 are noisy. Frequencies 26, 28, 29 and 31 are quiet;
b. At the controlled frequency management means c, frequencies 25, 26, 27 and 29 are noisy, while frequencies, 24, 28, 30 and 31 are quiet;
c. Reception quality was good at frequencies 24, 27, 29 and 31 and bad at frequencies 25, 26, 28 and 30;
d. At frequencies 27 and 29, although the channels were noisy at c's end, reception was good, probably because the signal over-powered the noise level;
e. At frequencies 28 and 30, although the channels were quiet at c's end, reception was bad, probably because of no propagation or a very low signal;
f. For transmission in the C-to-c direction, frequencies 24 and 31 may be a good choice;
g. For transmission in the c-to-C direction, frequencies 29 and 31 may be a good choice;
h. Depending on the nature and level of the noise at the receiver's end other frequencies may also be considered when the expected received signal level can be estimated.

In applications where, most of the time, only one-way transmissions are conducted (C-to-c), the frequency changing or allocating function, over the communication link, may be assigned to the controlled frequency management means c. Operation relies on just the one-way sounding broadcasts (C-to-c). A reliable and rapid decision will be made, determining the best pair of transmit/receive operational frequencies, for communication with the controlling frequency management means. This frequency allocation must be securely burst-transmitted to the controlling frequency management means to allow normal HF communications to proceed.

Following the reception of the sounding transmission cycle, c will wait a fixed number of time slots before attempting to respond to allow its communication transmitter time to tune to the frequency chosen for the c-to-C transmission. In preparation to respond, c shall automatically construct a reporting message made up of the selected C-to-c communication frequencies (till the next update). When responding, only upon arrival at the time slots that coincides with the selected c-to-C frequencies (in the FH sequence) will c turn-on its transmitter RF power for a burst-transmission of this message. This will automatically reveal to C the selected c-to-C frequency. c and C have now automatically tuned their fixed-channel HF communication receivers and transmitters to a selected pair of operational frequencies.

Normally the system operation over an HF link will involve a two-way sounding process, with the C assuming frequency assignment authority. Following the first C-to-c sounding cycle, having formed its Link Quality Pattern, c automatically responds with a c-to-C sounding broadcast. Again, within the single frame of 125 frequency hops, c's LQP sounding message will be repeated once every hop. This two-way sounding process will take less than 5 minutes.

C will now be looking at two LQPs which provide simultaneously the measured communication performance at both ends of the link and, therefore, enables a straightforward selection of optimal operating frequencies. The dissemination of frequency information will be conducted using a sounding broadcast burst-transmission followed by an acknowledge cycle by the net members.

Before the frequency management means can be used in an actual exchange of signals, some preparatory operation is required. Necessary data must be entered and stored: the frequency band or bands to be used, operational modes, IDs of net sender destination, key-variables, initial operating frequencies, longest frequency change time for the transceiver, and a certain agreed-to cycle start-time is also set in. This is used with the actual time to determine automatically the elapsed time of the operation for frequency hopping and key synchronization purposes. The actual time is acquired from a suitable reference external source having minutes-accuracy, such as an electronic watch, a count down over voice radio, etc.

To ensure proper net initiation under seach mode conditions, when a new number joins the net or transmissions have not taken place for many hours, a special Synchronization Cycle is provided. During this cycle a unique sync message, broadcast by the controlling terminal, is repeated once over each of the 125 channels.

Figure 3:
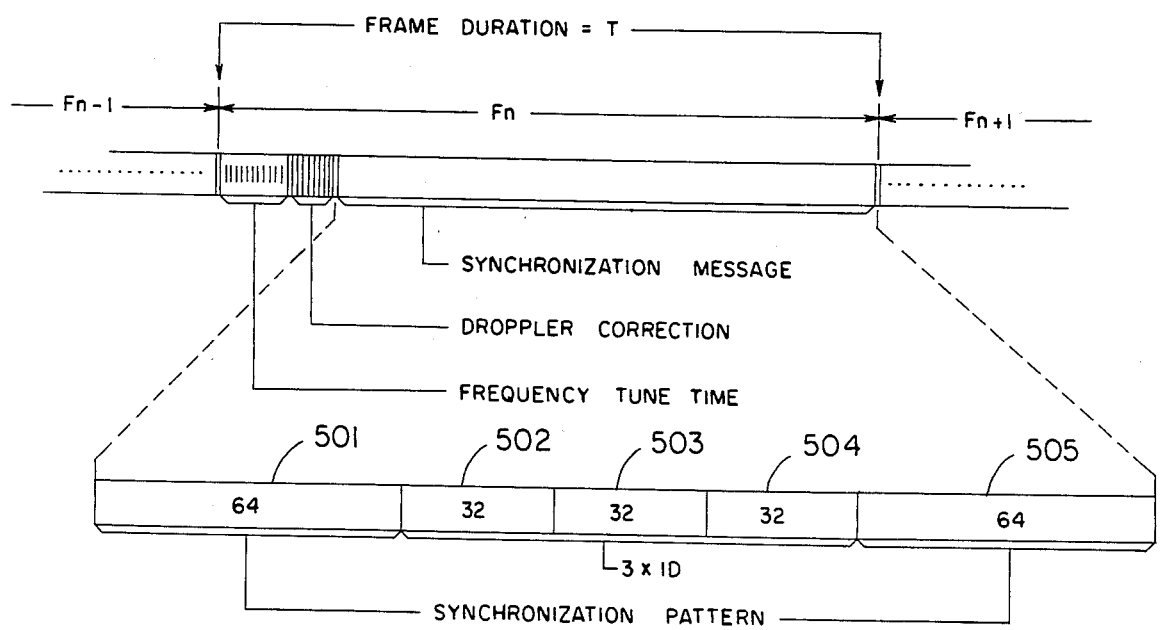
FIG. 3 outlines the format used in the network synchronization transmission cycle.

FIG. 3 illustrates a simplified transmission timing diagram of the Sync Cycle. In a typical frame, the first and last 64-bit data blocks are the two complementary unique words 501 and 505, designed to be detected as a doublet of a positive followed by a negative correlation peak. In the central data field the blocks 502, 503 and 504 of 96 bits comprise three eight-bit characters, alpha or numeric, devoted to the sender's ID+Destination, repeated three times.

Following initialization, which includes loading the terminal's NLSG with the common key, net synchronization is rapidly achieved if time-of-day internal clocks are wall set to within maximum $+D (t+T)$ seconds of real time, where t is the system hop-time between frequencies and T is the sysem dwell-time at each frequency. The order in which the system is sequenced through the group of channels, is controlled by the NLSG's output.

Upon entering the search mode, the frequency management means automatically advance their set time-of-day by D time-slots in time. The NLSGs are therefore forced to be within (0, 2D) time-slots ahead of the real time of day.

The search receiver will be taking unequal steps, jumping always ahead of the sounding transmitter, and waiting for the transmitter to arrive. The receiver waits 2D+1 time-slots on its present frequency, then jumps ahead 2D frequencies, then waits again 2D+1 time-slots, then jumps ahead 2D+2 frequencies, waits another 2D+1 time-slot, then jumps ahead again 2D frequencies, etc.

Following an initial shift of +D time-slots, and assuming t=0 and T=1 second, the optimal search procedure is: wait=2D+1 and search=at 2D, then at 2D+2. As a result of this search pattern, the controlling-terminal and the controlled-terminal meet on various frequencies, in other words they criss-cross each other until acquisition is achieved and the search procedure ends.

The average waiting time ($\overline{T}_D$) between meetings of the terminals during the search procedure is given by:

$$\overline{T}_D = \frac{(4D+2)(2D+1)}{4D+1}, \lim_{D \to 0} \overline{T}_D = 2D+1.$$

The maximum waiting time until the first meeting for a given D, is T max=2D.

During the synchronization period, the terminals meet on an average of $M_D$ different frequencies, where:

$$\overline{M}_D = \frac{N(4D+1)}{2(2D+1)^2},$$

where N is the number of assigned frequencies, N=125.

Frame synchronization exploits the systematic nature of the search detection process to realize a very reliable and rapid frame-sync recovery.

A digital correlator will detect arriving frame sync sequences and full utilization will be made of the so-called window technique. This method takes advantage of the fact that the sync sequences are periodic and that legitimate correlator outputs will have to be spaced in time according to the (2D)−(2D+1)−(2D+2)−(2D+1)− ... pattern. Acquisition will be declared after detection of 3 sync sequences. The detection thresholds will determine the average synchronization time, as well as the max. sync. time for specified miss/false-alarm probabilities.

If the probability of detecting a sync sequence on a channel is Ps, the average probability of detecting 3 consecutive syncs at proper spacings is:

$$\overline{P}_3 = (\overline{M}_D - 2)P_s^3(1 - P_s)^{\overline{M}_D - 3}$$

Where Ps is given by the probability of detecting "over the threshold" number of correct bits in a PN sequence; it is a function of the channel BER.

Hence, the average synchronization time is $P_3^{-1}$. When three successive hits are found, from among the channels crossed (before one scanning cycle is complete) the operation proceeds to the steady-state mode. In this mode the receiver is in full synchronism with the transmitter and hops with it at the regular rate. The frame-sync detector maintains a continuous tracking process and monitors the end of the sounding transmission.

This unique synchronization algorithm is another important aspect of this invention.

INVENTION IMPLEMENTATION

Figure 4:
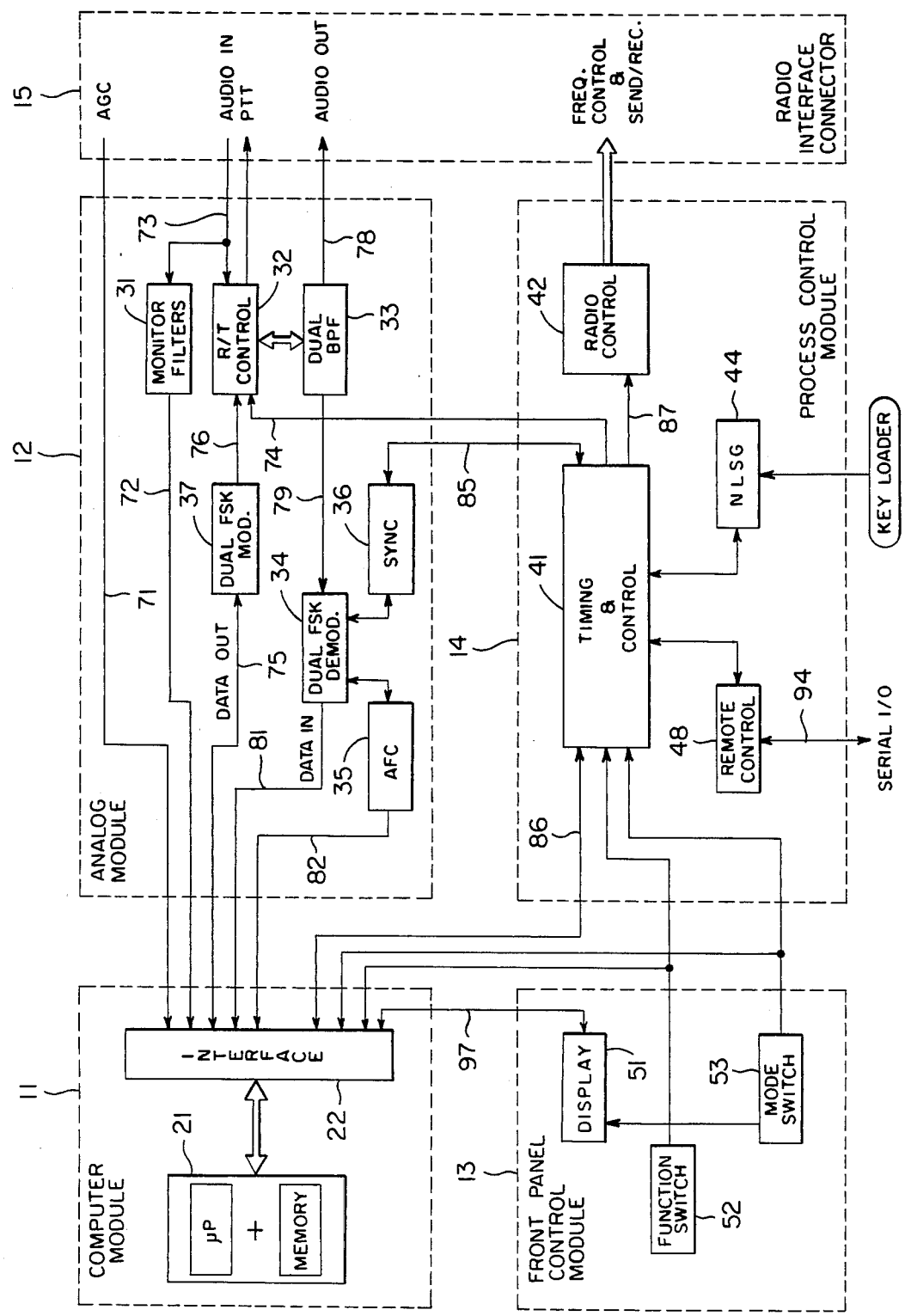
FIG. 4 is a simplified block diagram of the frequency management means according to an embodiment of the present invention.

Referring to FIG. 4 which is a block diagram of the frequency management means, it is shown to comprise four major modules:

1. Analog Module 12, which includes the terminal's data link and basic sensors used for signalling in calling and channel monitoring;
2. Process Control Module 14, which generates the timing waveforms, and controls the sounding, and radio functions;
3. Computer Module 11, which is responsible for the signal processing, channel quality analysis and overall system control;
4. Front Panel Control Module 13, which includes all the operator's manual interface controls and indicators.

When not communicating or performing active sounding or calling functions, the frequency management means perfoms channel monitoring and calls searching. From the radio interface connector 15 the radio receiver AGC signal (s-meter) is fed through conductor 71 to the computer module 11. The received audio is passed through conductor 73 to monitor filters 31 and bi-directional analog gate or R/T control 32. The monitor filters 31 are examining discrete segments in the 300-3300 audio band and signals present are delivered to the processor module 11 via conductor 72. These audio signals are A/D converted in the interface 22 and processed by the microprocessor 21. The microprocessor evaluates the spectra density, noise level and occupacy profile of each monitored frequency. These channel parameters are stored and updated in the memory 21.

When the frequency management means initiates a sounding transmission, a signal appears, through conductor 74, at the input of device 32, which reverses the direction of the analog signal flow. Out of the computer module 11 the digital sounding message is applied, through conductor 75 to the dual FSK modulator 37. This device includes two widely spaced (in frequency) FSK modulators to which the same message is fed simultaneously, Two FSK output signals are then passed, via conductor 76, to the bi-directional analog gate 32 which applies them to the dual bandpass filters 33 for signal shaping and improved isolation. Conductor 78 feeds the combined FSK outputs to the radio modulator via the radio interface 15. During the sounding, the monitoring is stoped, device 32 blocking the reception path.

When in receiving mode, device 32 is placed in receive mode by conductor 74 and it routes the two FSK signals received from the radio demodulator via the radio interface 15, through the dual bandpass filters 33, gating their output via conductor 79 to the dual FSK demodulator 34. The output of this device which is now the restored sounding or calling digital message is fed through conductor 81 to the processor module 22.

The automatic frequency control device 35 provides a means of sensing the doppler frequency shift and applying an adaptive compensation to improve the bit detection capability of the FSK demodulators. In fact, instead of FSK signalling multitone DPSK signalling is also available, for which frequency shift correction is necessary. To help synchronize the local clock to the incoming digital burst, the bit synchronizer device 36 continuously interacts with the central timing source 41, through conductor 85. The measured doppler shift as well as the processed corrections are transferred via conductor 82 to the computer module interface 22 for link quality evaluation.

Under program control a multiple of unique algorithms and functions are simultaneously being processed in the microcomputer module 21. These deal with the rapid signal measurements, evaluations, and frequency management decisions that must be accomplished in almost real time, while visiting each of the 125 frequencies. Testing of noise and interface characteristic parameters as well as actual communication quality parameters, the generation and grading of IMP and LQP sounding signals, processing the synchronization acquisition scheme, message block-encryption/decryption, secure protocol, frequency assignments, etc., all these activities are computer controlled. Specifically, the sampled audio is used by the microcomputer to measure the signal to noise ratio (SNR) of the received sounding signal. This is done by cummulatively summing the signal power in various bands of the spectrum. The spectral monitoring is performed by an FFT routine performed by the microcomputer 21. The frequency slots that are known to carry signalling are summed up and compared to the remaining frequency slots. Thus, an estimate of the SNR for each sounded channel is obtained and updated with a "fading memory". Two major parameters of each channel that are also estimated by the microcomputer 21 are the rms fading rate and the rms multipath delay. Using the outputs of consecutive FFT outputs $V_{q,m}$ these two parameters are evaluated by a "time and frequency sampling" of the tested HF channel. The employed algorithms perform differentiation in time and frequency when evaluating the estimated fading rate D and multipath delay M:

$$D = (1/\pi P) \sqrt{\frac{\sum_{k=1}^{L-1}(V_{q,k+1} - V_{q,k})^2}{\frac{L-1}{L}\sum_{k=1}^{L}V_{q,k}^2}}$$

$$M = (1/\pi F) \sqrt{\frac{\sum_{k=1}^{L}\sum_{q=1}^{15}(V_{q+1,k} - V_q)^2}{\frac{15}{16}\sum_{k=1}^{L}\sum_{q=1}^{16}V_{q,k}^2}}$$

Timing-and-process-control device 41 distributes all timing waveforms, stores and controls all initialization data serially inputted, through conductor 94 and remote control interface 48. It receives the output of the non-linear sequence-generator device 44. By means of an external loader key variables are serially fed to the NLSG for the generation of a random sequence which is used for digital encryption, frequency translation and secure operation. The radio control device 42 receives control data from the timing device 41 via conductor 87, and couples frequency and SEND/REC control information to the radio system, which enables the radio hopping through the plurality of HF frequencies for monitoring and sounding/calling purposes.

Front panel control module 13 provides a manually operated interface and comprises a time-of-day display frequency, address and data indicator device 51, a function switch 52 for testing, initialization, time setting, band selection, etc., and a mode switch 53 to select automatic/manual operation, one/two way sounding, etc.

Figure 5:
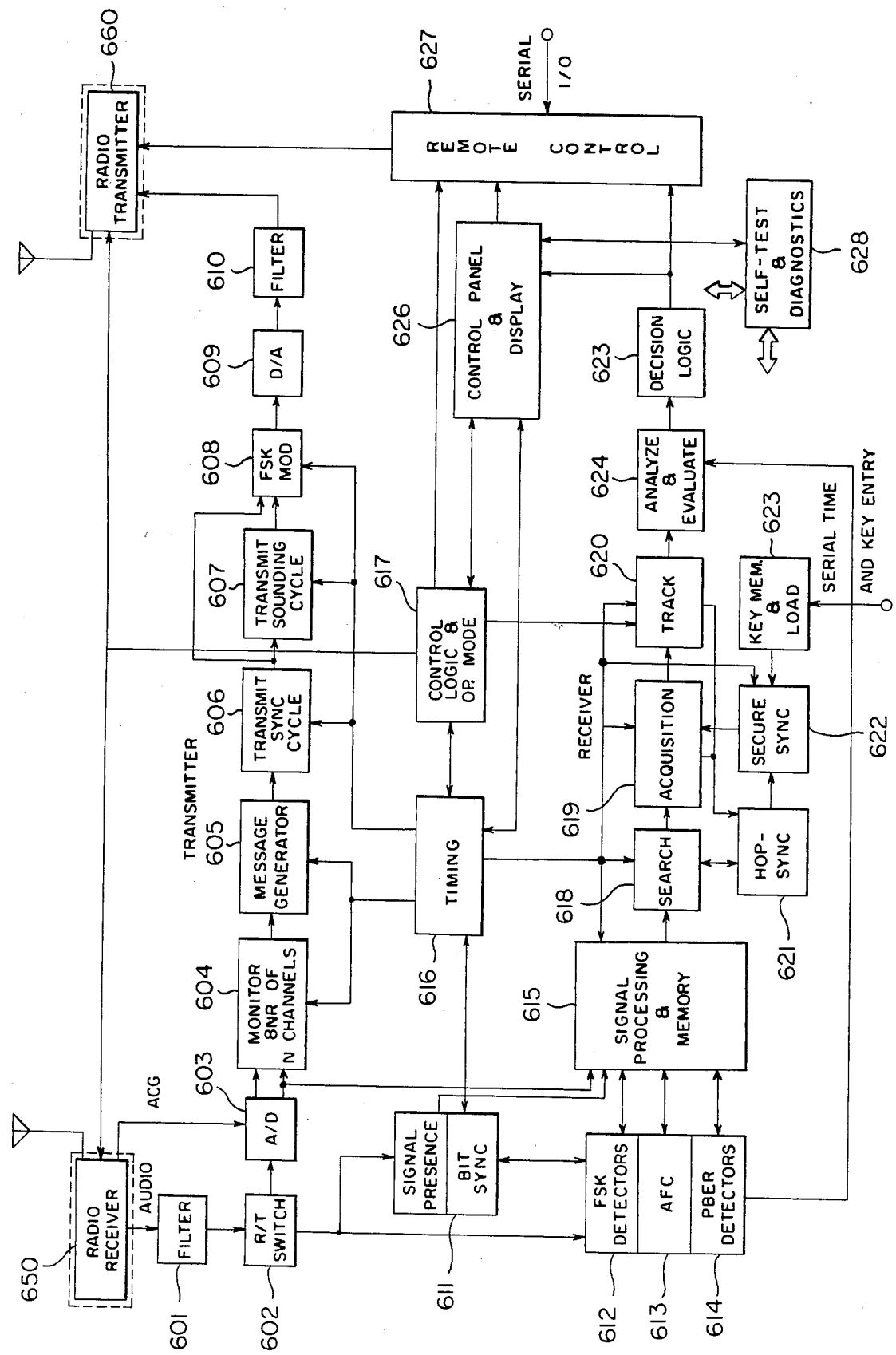
FIG. 5 is a functional block diagram of the frequency management system according to an embodiment of the present invention.

A functional block diagram of the frequency management system is depicted in FIG. 5. It contains two functional groups which are the receiver group and the transmitter group. Functional modules numbered 605 to 610 are part of the transmitter, while functional modules 601 to 604 and 611 to 625 (excluding 616 and 617) are part of the receiver. The timing originates from 616 which provides the required clocks to thr various functions. Two inputs are provided by the external radio receiver 650, namely, the received audio and the AGC. The audio is inputed to the receiver group where the bit synchronization. (611) and the detection (612) functions are being performed. Auxillary functions like frequency shift corrections (613) and pseudo-BER measurement (614) are also part of the receiver group. The audio and the AGC are being sampled (603) and monitored (604) and the IMP or LQP is generated (605). In the transmitter group, following the sync pattern transmission (606) the IMP or LQP as a sounding message is being transmitted (607) through the modulator (608). The frequency hopping of the radio units (receiver and transmitter) is being controlled by the control function (617). The sync search (618), acquisition (619) and tracking (620) are performed in the receiver group on the received data. The hop-sync of the receiver (621) is initialized during the acquisition phase, while the crypto (secure) sync (622) is initiated from the timing unit (616), the key value and time being loaded externally (623). The sync tracking unit (620) tracks the frequency hopping pattern following acquisition. Once the sounding cycle has ended and the receiver has analysed (624) the sounding message, a decision concerning the best frequency subset is performed (625). This decision is communicated to the operator (human or automatic) via the remote control I/O (627) and is displayed on the display (626). Via the control panel (626) or remote control port (627), a self-test cycle can be initialized (628), the results of which are stored (for further statistics) and communicated to the operator as well.

SUMMARY

Based on the above descriptions the frequency management system can be summed up as follows: The system uses frequency management means at each net member connected to the local HF transceiver (FIG. 3c). At each site the radio frequency is controlled via the radio interface connector (FIG. 4, unit 15) by the radio control unit (FIG. 4, unit 42). The radio audio I/O is connected to the analog module (FIG. 4, unit 12), the PTT to the radio being activated from the same unit when transmission is required. When not transmitting the radio is hopped on a predetermined set of frequencies monitoring the channel activity level and searching for incoming calls (FIG. 5, unit 611–616). The accumulated channel occupancy statistics (IMP) is used when sounding is performed for choosing the best subset of communication frequencies. As long as the current set of communication frequencies is of satisfactory quality, no sounding is required. When the communication quality deteriorates, the controlling station performs a sounding cycle. During this cycle, its IMP is transmitted as a sounding message (FIG. 5, units 605–610). This message, after synchronization, relates to the controlled station the channel occupancy statistics at the controller while the propagation qualities of each sounded frequency are measured by the controlled station. Thus, a Link Quality Pattern (LQP) is established at the controlled site (FIG. 5, unit 624). In the one-way sounding mode (set by the panel—FIG. 4, unit 53), the controlled station chooses the best new set out of the tested frequencies (FIG. 5, unit 625) and allocates them to the net (including the controller). The signal processing and some of the decisions are performed by a microprocessor such as the TMS-32010 type micro-computer (FIG. 4, unit 21), while the actual real-time operation is controlled by the timing and control unit (FIG. 4, unit 41) which contains a number of standard programable counters and logic arrays. In order to protect the operation sequence against jamming, the hopping sequence as well as the transmitted data (FIG. 2) are advantageously encrypted by an NLSG sequence (FIG. 4, unit 44). In order to enable the connection to any HF radio, the "personality module" (FIG. 4, unit 42) contains an additional microcomputer as well (such as the Intel 8031 type). The remote control unit (FIG. 4, unit 48), which enables remote control operation of the frequency management means, shares some of the features of the 8031 which is located on the same module (FIG. 4, unit 14). In order to start the operation sequence, a key-loader or the front panel (FIG. 4, unit 52) is used (FIG. 5, unit 623) to load the initialization variables: time (TOD), crypto K, sounding range or sounding frequencies, communication frequencies, forbidden frequencies, addresses (net-members), function (controller, or controlled, or passive member) and frequency transition time of the slowest transmitter. Finally, the frequency management means contains a comprehensive set of on line and off-line self-tests (FIG. 5, unit 628), whose results are displayed on the front panel (FIG. 4, unit 51 and FIG. 5, unit 626) and reported via remote control (FIG. 5, unit 627).

Any of the functions described herein, given the teaching of the invention may be implemented by those skilled in the art. Thus while a particular embodiment of the present invention has been shown and described, it is apparent that changes and modifications may be made thereon without departing from the invention in its broadest aspects. The foregoing Detailed Description is intended to be merely exemplary and not restrictive.

What we claim is:

1. A high frequency (HF) frequency-management system that performs automatic selection of the optimum HF frequency for reliable communications between two or more stations of an HF net and dissemination of the optimum frequency, for the automatic establishment of HF communications path between two or more radio stations of the said net, comprising of a frequency management means that controls the operation of a regular HF radio communications transmitter and receiver at each stations; the said frequency-management means comprising means for transmitting sounding signals synchronously and repeatedly over a finite group of HF frequencies, from a first radio communications station to a second radio communications station; means for link quality evaluation (LQE) at the second station; means for transmitting back sounding signals, synchronously and repeatedly over said finite group of HF frequencies, from said second station back to said first station; means for selecting optimum HF frequencies at the said first station, based on said sounding signals and LQE; means for dissemination of said optimum HF frequencies information, by the said first station to the said second station (and all other stations in the net), for the automatic establishment of an HF communications path between said stations, wherein said first and second stations utlize said regular HF radio communications transmitter and receiver for both the frequency management functions as well as for the usual communication function, in time interleaved mode controlled by the said frequency management means; and means for monitoring the noise and interferences on said finite group of HF frequencies, means for searching for incoming communication or sounding calls; means for performing the timing and control of the HF radios; means for acquiring and maintaining synchronization of the frequency management system and communication net; and each said means performing the scanning of the HF frequencies, the detection and measurement of signals, noise and interferences on each frequency and the timing synchronization as required for the frequency management operation.

2. A frequency management system according to claim 1, wherein at each station the frequency management means includes means for utilizing the radio receiver to search for incoming calls and to measure the noise and interference by sequentially monitoring the interference and occupancy of a finite group of HF channels, each channel tuned to a different frequency; means for measuring the radio receiver AGC level and radio receiver noise output and distribution; means for measuring in-channel interference characteristics; means for classifying noise and interference present on each of the finite set of HF frequences into a predetermined number of categories, according to a predetermined set of criteria; means for hard-labeling of each one of the said HF frequencies as either a binary "1" for a 'quiet' HF frequency or a binary "0" for a 'noisy' HF frequency based on a predetermined set of criteria; means for storing and updating the resulting set of binary labels (IMP-Interference Measurement Pattern), wherein each bit represents a channel occupancy evaluation of one of the HF frequencies visited; means for using this binary word at the said first station as the sounding signal from the said first station to the said second station; and each said means performs the necessary gathering and storing of information concerning the noise, interference and channel occupancy conditions at said first station as well as at said second station.

3. A system according to claim 2, wherein the number of channels is from 25 to 130 with 4 KHZ spacing, the number of selected optimal communication frequencies is from 2 to 20, and the number of categories used is from 2 to 8.

4. A frequency management system according to claim 1 wherein said first station originates a sounding transmission repeatedly, once over each of the said finite group of HF frequencies by having its HF transmitter scan said HF frequencies; said sounding transmission being an FSK or DPSK transmission containing the IMP and also synchronization information for synchronizing said second station receiver so that it is sequenced through same said group of HF frequencies at an equal rate, being at each one of the HF frequencies at the same period of time as the transmitter, to allow the sounding message to be received.

5. A frequency management system according to claim 1 comprising timing and control means, wherein the timing and control means comprise means for randomly selecting N HF frequencies from within a specified HF sub-band given its limits $f_{low}$ to $f_{high}$; means for storing said N HF frequencies as alternate channels with each channel having a predetermined frequency; means for placing said first and second stations in a transmit or receive mode; means for sequencing and tuning the HF receiver and transmitter through the group of N HF frequencies; means for providing timing for the frequency management system operation, such as bit synchronization, frame sync acquisition, sync cycle operation, and sounding cycle operation; means for generating a predetermined sequence based on the input of a key variable and real time of day; and each said means cooperates with each other such as to enable full timing synchronization between said first and second station.

6. A frequency management system according to claim 1 wherein the link quality evaluation (LQE) means comprises of means for detecting the noise present on each of the (investigated) channels; FSK and DPSK data detectors for providing a signal representative of the data levels that are present on the communication channels that the receiver is tuned; means for determining the signal-to-noise ratio; means for measuring the fading rate and its spread; means for measuring the rms multipath delay spread; means to arrive at the actual bit-error-rate; means for quantizing the parameters, signal-to-noise ratio and bit-error-rate, in combination with one or more of the parameters, fading rate, delay spread, channel noise, data levels, measured on the communication channel, to define the desired predetermined number of link quality categories according to a predetermined set of criteria; means for generating a corresponding number of binary words, each N-bit long, one for each category, wherein each bit represents a hard-decision qualifying respectively one of the N channels sounded (LQP-Link Quality Pattern); and each said means for measuring and storing the various channel parameters cooperates with the LQE and LQP means of the frequency management system in order to accurately characterize each of the said set of N HF frequencies as to its quality as a two-way communication channel for voice or data transmission.

7. A frequency management system according to claim 1 comprising an optimal channel selection means, wherein the optimal channel selection means comprises of means for evaluating and comparing the receive Interference Measurement Patterns (IMP), which is the signals from said first station to said second station information contained in the sounding, the IMP locally measured and the Link Quality Pattern (LQP), which is the information contained in sounding signals from said second station to said first station, measured at said second station; means for evaluationg and comparing the LQPs received and the LQEs measured at the first station, to allow the first station to derive, based on a two-way exhange of signals sounding, optimal operating frequencies.

8. A frequency management system according to claim 1 containing frequency dissemination means, which comprises of means for selecting and storing optimal communication frequencies; means for said first (or second) station to transmit on the selected frequencies information preceded by a unique sender's identity and address, regarding the selected frequencies; means for utilizing the synchronization achieved between the stations, to disseminate frequency information by transmitting over the selected optimal frequencies; and each said means for storing and disseminating sender's identity, sender's address and selected communication frequencies, enable the frequency management system to perform the frequency management functions as well as the communication functions by addressing the desired station at will.

9. A frequency management system according to claim 1 wherein the receiver synchronization means comprises of means for transmitting a N-frame sync cycle, pseudorandomly hopping over the group of N HF frequencies, where each frame includes a unique sync format; means adapted to step the HF receivers at an irregular rate but in a unique search pattern of "skipping x channels and the waiting Y time-slots, etc", designed to keep the receiver always ahead of the transmitters; means for maintaining this search pattern until a predetermined number of syncs is detected, indicating synch acquisition; means for maintaining a continuous process of tracking frame syncs during the sounding signals transmissions; means for pseudo-randomly sequencing and tuning the HF receiver and transmitter through the group of N HF frequencies; means for generating a pseudorandom sequence based on the input of a key variable and real time of the day.

10. A method of selecting an optimum HF frequency for reliable communication between two or more stations of an HF net and for disseminating the optimum frequency, establishing automatically an HF communication path between two or more stations of said net, which comprises the steps of controlling the operation of a regular HF communications transmitter and receiver at each station, transmitting sounding signals synchronously and repeatedly over a finite group of HF frequencies, from a first radio communications station to a second radio communications station, continuously monitoring the interference and occupancy of a finite group of HF channels, each channel a different frequency; hard-labeling each one of the said channels as either a binary "1" for a 'quiet' channel or a binary "0" for a 'noisy' channel, based on a predetermined set of criteria; storing and updating the resulting set of binary labels wherein each bit represents an evaluation of one of the HF frequencies visited; using this binary word as a sounding signal and transmitting this signal repeatedly, once over each of the said finite group of frequencies by having the transmitter scan said channels; synchronizing said second station receiver so that it is sequenced through same said group of channels at an equal rate, being at each one of the channels at the same period of the time as the transmitter, to allow the sounding message to be received; majority-detecting said redundant sounding message by the receiver; performing link quality measurements on each of the scanned group of frequencies; hard-labeling each one of the said channels as either binary "1" for a "good" or "acceptable", and a binary "0" for a "bad" or "not-acceptable" communication quality, based on another set of criteria; storing the resulting set of binary labels to be used by it in forming the answer-back sounding signal from said second station to said first station; transmitting the answer-back sounding message repeatedly, once over each of the said group of channels by having said second station transmitter scan said channels; majority-detecting said answer-back sounding message by the first station receiver, performing link quality measurements by the first station receiver, on each one of the said scanned group of frequencies; selecting optimal frequencies by the first station, for reliable communications in both directions, based on the analysis of the received and locally evaluated link quality patterns; utilizing the synchronization maintained between the stations, to disseminate the selected frequencies information to said second station; automatically tuning the communications transmitters and receivers to the selected preferred frequencies, thus establishing reliable communication paths between the stations.

11. A method according to claim 10 wherein at each station the HF communication radio receiver is utilized to search for incoming calls and to measure the noise and interference by sequentially monitoring the interference and occupancy of a finite group of HF channels, tuning each channel to a different frequency; measuring the radio receiver AGC level and radio receiver noise output and distribution; measuring in-channel interference characteristics; classifying noise and interference present on each of the finite set of HF frequencies into a predetermined number of categories according to a predetermined set of criteria; hard-labeling each one of said HF frequencies as either binary "1" for a 'quiet' HF frequency or a binary "0" for a 'noisy' HF frequency based on a predetermined set of criteria; storing and updating the resulting set of binary labels (IMP-Interference Measurement Pattern), wherein each bit represents a channel occupancy evaluation of one of the HF frequencies visited; using this binary word at said first station as the sounding signal from said first station to said second station; and further performing the necessary gathering and storing of information concerning the noise, interference and channel occupancy conditions at said first station as well as at said second station.

12. A method according to claim 10 which further comprises the steps of originating at said first station a sounding transmission repeatedly, once over each of the said finite group of HF frequencies by having its HF transmitter scan said HF frequencies; said sounding transmission being an FSK or DPSK transmission containing the IMP and also synchronization information for synchronizing said second station receiver so that it is sequenced through same said group of HF frequencies at an equal rate, being at each one of said HF frequencies at the same period of time as the transmitter, to allow the sounding message to be received.

13. A method according to claim 12 further comprises the steps of performing by the first station upon receiving the said back sounding message and performing an LQE over each one of the back sounded channels to arrive at the optimum frequencies, including the steps of majority-detecting said answer-back sounding message at the first station receiver; performing link quality measurements at the said group of frequencies; selecting optimal frequencies at the first station for reliable communications in both directions, based on the analysis of the received link quality patterns (LQP) and on the derived LQE.

14. A method according to claim 10 which further comprises the steps of randomly selecting N HF frequencies from within a specified HF sub-band given its limits $f_{low}$ to $f_{high}$; storing said N HF frequencies as alternate channels with each channel having a predetermined frequency; placing the first and second station in a transmit or receive mode; sequencing and tuning the HF receiver and transmitter through the group of N HF frequencies; providing timing for the frequency management system operation, such as bit synchronization, frame sync acquisition, sync cycle operation, and sounding cycle operation; generating a predetermined sequence based on the input of a key variable and real time of day; and cooperating with each other such as to enable full timing synchronization between said first and said second station.

15. A method according to claim 10 wherein at the second station, upon receiving said sounding signal from the first station, repeated over all the said group of HF frequencies in time sequence, link quality evaluation is performed.

16. A method according to claim 10 wherein the link quality evaluation (LQE) comprises the steps of detecting the noise present on each of the (investigated) channels; FSK and DPSK data detecting for providing the data levels that are present on the communication channels that the receiver is tuned; determining the signal-to-noise ratio; measuring the fading rate and its spread; measuring the rms multipath delay spread; using the demodulated message to arrive at the actual bit-error-rate; quantizing the parameters, signal-to-noise ratio and bit-error-rate, in combination with one or more of the parameters, fading rate, delay spread, channel noise, data levels, measured on the communication channel, to define the desired predetermind set of criteria; generating a corresponding number of binary words, each N-bit long, one for each category, wherein each bit represents a hard-decision qualifying respectively one of the N channels sounded (LQP-Link Quality Pattern); and said steps for measuring and storing the various channel parameters cooperate with the LQE and LQP means of the frequency management system in order to accurately characterize each of said set of N HF frequencies as to its quality as a two-way communication channel for voice or data transmission.

17. A method according to claim 10 which further comprises the steps of responding by the said second station by transmitting the back sounding signal comprising of transmitting the answer-back sounding message repeatedly, once over each of the said group of HF frequencies by having the second station transmitter scan said HF frequencies; the answer back sounding being the LQP message generated by said LQE means at the said second station.

18. A method according to claim 10, wherein the number of channels is from 25 to 130 with 4 KHz spacing, the number of selected optimal communication frequencies is from 2 to 20, and the number of categories used is from 2 to 8.

* * * * *